May 15, 1923.
S. G. RUSSELL
1,455,358
FISHING REEL
Filed Dec. 12, 1921
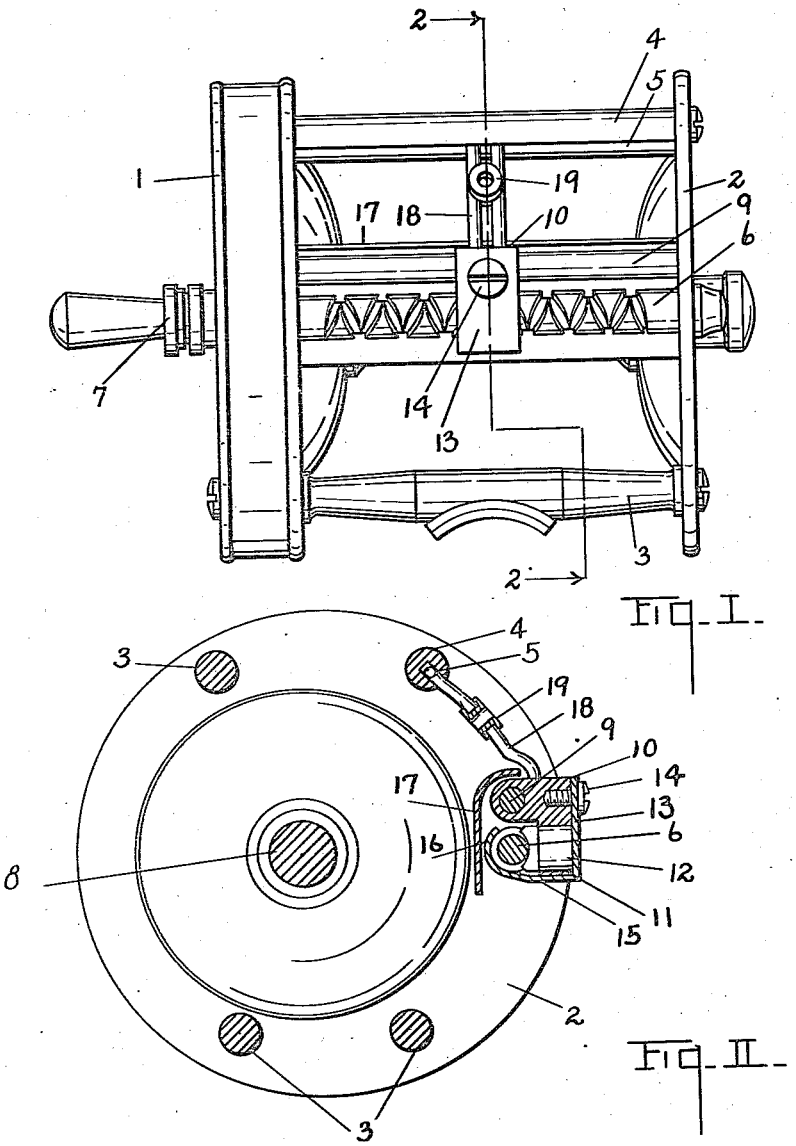
FIG. I.
FIG. II.
INVENTOR.
SAMUEL G. RUSSELL
BY *Chappell & Earl*
ATTORNEYS Patented May 15, 1923.

1,455,358

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed December 12, 1921. Serial No. 521,744.

*To all whom it may concern:*

Be it known that I, SAMUEL G. RUSSELL, a citizen of the United States, residing at Kalamazoo, county of Kalamazoo, State of Michigan, have invented certain new and useful Improvements in Fishing Reels, of which the following is a specification.

This invention relates to improvements in fishing reels.

The main object of this invention is to provide an improved fishing reel of the level wind type in which the line guide carriage is mounted to move very freely and one in which wear on the parts is minimized and the parts are simple, economical in structure, and easily assembled.

Further objects, and objects pertaining to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is fully illustrated in the accompanying drawing forming a part of this specification in which:

Fig. I is a side elevation of my improved fishing reel.

Fig. II is a transverse section on a line corresponding to the broken line 2—2 of Fig. I.

Similar reference characters refer to similar parts in both views.

Referring to the drawing, 1 represents the chambered head of the reel and 2 the tail plate thereof. The head and tail plate are connected by the pillars 3 and 4, the pillar 4 having a longitudinal groove 5 therein, the purpose of which will appear as the description proceeds.

The traversing screw or reversely threaded shaft 6 is journaled in the frame and members there provided with driving connections to the crank 7. As the details of these driving connections form no part of my present invention, they are not described here. The spool 8 is also driven from the crank 7.

I provide a carriage slide rod 9 above and parallel to the traversing shaft 6. The carriage 10 is slidably mounted on this rod to project outwardly therefrom and has a portion projecting downwardly in front of the traversing shaft 6. This downwardly projecting portion has a socket 11 for the pawl 12 so that the pawl is supported in coacting relation to the threads of the screw. The socket 11 is open at its outer end, the pawl being retained therein by the clip or retaining member 13 which is secured in position by the screw 14.

The clip 13 is provided with an arm 15 having an upwardly projecting hook-like portion 16 at its inner end which projects upwardly at the rear of the traversing shaft, being normally out of contact therewith but adapted to engage the same preventing excessive tilting movement of the carriage in the event the pawl "rides up" on the threads of the traversing shaft as sometimes occurs, particularly at the reversing point of the pawl in the event the parts are not properly lubricated, or grit or the like comes in contact with the pawl or the traversing shaft. The clip 13, arm 14 and its hook 16 are in the embodiment illustrated formed as a sheet metal stamping, which has the advantage of economy of manufacture, and the arm will also yield or spring under stress, it being desirable that the retaining member should be resilient or yielding.

A guard or housing 17 is provided for the shaft and slide rod, this housing being disposed between the spool and these parts, and is provided with a portion at the top overhanging the guide rod. A line guide member 18 projects upwardly at the front of the housing with its upper end engaging and guided by the groove 5 in the pillar 4.

The eye 19 through which the line is passed is free to slide up and down in the line guide member.

With the parts thus arranged the carriage moves very freely with a minimum of wear and friction on the traversing shaft, in fact, the only engagement therewith being through the pawl unless the pawl should "ride up" on the threads, as has been described, in which event the arm 15 engages the shaft. The arm being a spring arm prevents injury to the parts and the pawl is promptly returned to its proper operating relation to the traversing shaft.

My improved fishing reel is very simple and economical in its parts and they are easily assembled and disassembled as occasion may require.

Having thus described my invention, what I claim as new and desire to secure by Letters Patent is:

1. In a fishing reel, the combination of a frame, a spool, a traversing shaft, a carriage slide rod disposed above and parallel to said traversing shaft, a line guide carriage slidable on said rod and provided with a pawl socket open at the outer side of the carriage, a pawl disposed in said socket to coact with said shaft, a clip mounted on said carriage to close the socket and provided with an arm projecting upwardly at the rear of the traversing shaft and normally out of contact therewith, a housing for said traversing shaft and carriage slide rod arranged in the side thereof and having a top portion overhanging the same, a line guide on said carriage projected upwardly at the front of the housing, and a grooved pillar adapted to receive the upper end of said line guide member.

2. In a fishing reel, the combination of a frame, a spool, a traversing shaft, a carriage slide rod disposed above and parallel to said traversing shaft, a line guide carriage slidable on said rod and provided with a pawl socket open at the outer side of the carriage, a pawl disposed in said socket to coact with said shaft, a clip mounted on said carriage to close the socket and provided with an arm projecting upwardly at the rear of the traversing shaft and normally out of contact therewith, and a line guide member on said carriage.

3. In a fishing reel, the combination of a frame, a spool, a traversing shaft, a carriage slide rod disposed adjacent and parallel to said traversing shaft, a line guide carriage slidable on said rod and provided with a pawl socket open at its outer end, a pawl disposed in said socket to coact with said shaft, a clip member mounted on said carriage to retain said pawl in said socket and provided with an arm projecting at the rear of the traversnig shaft but normally out of contact therewith, and a line guide member on said carriage.

4. In a fishing reel, the combination of a frame, a spool, a traversing shaft, a carriage slide rod disposed adjacent and parallel to said traversing shaft, a line guide carriage slidable on said rod and provided with a pawl coacting with said shaft, a retaining member for said pawl provided with an arm projecting at the rear of the traversing shaft but normally out of contact therewith, and a line guide member on said carriage.

5. In a fishing reel, the combination of a frame, a spool, a traversing shaft, a carriage slide rod disposed adjacent and parallel to said traversing shaft, a line guide carriage slidable on said rod and provided with a pawl coacting with said shaft, a retaining member projecting at the rear of the traversing shaft but normally out of contact therewith, and a line guide member on said carriage.

6. In a fishing reel, the combination of a frame, a spool, a traversing shaft, a carriage slide rod disposed adjacent and parallel to said traversing shaft, a line guide carriage slidable on said rod and provided with a pawl coacting with said shaft, a spring member mounted on said carriage to coact with said traversing shaft when the carriage is tilted from its normal position, and a line guide member on said carriage.

In witness whereof I have hereunto set my hand and seal in the presence of two witnesses.

SAMUEL G. RUSSELL. [L. S.]

Witnesses:
A. L. BURRELL,
C. H. PIERCE.